United States Patent
Vannuffelen et al.

(10) Patent No.: US 7,511,813 B2
(45) Date of Patent: Mar. 31, 2009

(54) DOWNHOLE SPECTRAL ANALYSIS TOOL

(75) Inventors: Stephane Vannuffelen, Tokyo (JP); Kentaro Indo, Machida (JP); Toru Terabayashi, Sagamihara (JP); Tsutomu Yamate, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 455 days.

(21) Appl. No.: 11/307,173

(22) Filed: Jan. 26, 2006

(65) Prior Publication Data
US 2007/0171414 A1    Jul. 26, 2007

(51) Int. Cl.
*G01J 3/28* (2006.01)
(52) U.S. Cl. .................... 356/328; 250/269.1
(58) Field of Classification Search .......... 356/328; 250/269.1
See application file for complete search history.

(56) References Cited

U.S. PATENT DOCUMENTS

| | | | |
|---|---|---|---|
| 3,780,575 A | 12/1973 | Urbanosky | |
| 3,859,851 A | 1/1975 | Urbanosky | |
| 4,842,633 A | 6/1989 | Kuribayashi et al. | |
| 4,860,581 A | 8/1989 | Zimmerman et al. | |
| 4,994,671 A | 2/1991 | Safinya | |
| 5,166,747 A | 11/1992 | Schroeder et al. | |
| 5,167,149 A | 12/1992 | Mullins et al. | |
| 5,201,220 A | 4/1993 | Mullins et al. | |
| 5,266,800 A | 11/1993 | Mullins | |
| 5,331,156 A | 7/1994 | Hines et al. | |
| 6,476,384 B1 | 11/2002 | Mullins et al. | |
| 6,693,701 B2 | 2/2004 | Hansen | |
| 6,740,366 B2 | 5/2004 | Hori et al. | |
| 6,849,209 B2 | 2/2005 | Minami et al. | |
| 6,849,350 B2 | 2/2005 | Minami et al. | |
| 6,956,204 B2 | 10/2005 | Dong et al. | |
| 2002/0066309 A1 | 6/2002 | Tubel et al. | |
| 2005/0018192 A1 | 1/2005 | DiFoggio et al. | |
| 2005/0103980 A1 | 5/2005 | Schultz et al. | |
| 2007/0159625 A1* | 7/2007 | DiFoggio .................... 356/328 |

FOREIGN PATENT DOCUMENTS

| JP | 2001009843 A1 | 1/2001 |
|---|---|---|
| WO | WO 2004/083833 A1 | 9/2004 |

* cited by examiner

*Primary Examiner*—F. L Evans
(74) *Attorney, Agent, or Firm*—Matthias Abrell; Jaime Castano; Dale Gaudier

(57) ABSTRACT

Spectral analysis system for downhole applications is provided utilizing an inorganic replica-type grating that is configured to operate as a diffractive element that provides broad spectral coverage in high temperature downhole environments.

30 Claims, 14 Drawing Sheets

DOWNHOLE SPECTRAL ANALYSIS TOOL

FIELD OF THE INVENTION

The present invention relates to the field of spectral analysis in high temperature environments. More particularly, the present invention is directed to utilizing a grating configured for downhole conditions in various devices, such as optical spectrometers and tunable laser-based tools, for broad spectral analysis in subterranean formation evaluation and testing for the purpose of exploration and development of, for example, hydrocarbon-producing wells, such as oil or gas wells.

BACKGROUND OF THE INVENTION

Downhole fluid analysis is an important and efficient investigative technique typically used to ascertain characteristics and nature of geological formations having hydrocarbon deposits. In this, typical oilfield exploration and development includes downhole fluid analysis for determining petrophysical, mineralogical, and fluid properties of hydrocarbon reservoirs. Fluid characterization is integral to an accurate evaluation of the economic viability of a hydrocarbon reservoir formation.

Typically, a complex mixture of fluids, such as oil, gas, and water, is found downhole in reservoir formations. Wireline formation testing tools for formation fluid analysis are disclosed in, for example, U.S. Pat. Nos. 3,780,575, 3,859,851 and 6,476,384, the entire contents of which are hereby incorporated herein by reference.

Formation fluids under downhole conditions of composition, pressure and temperature typically are different from the fluids at surface conditions. For example, downhole temperatures in a well could range from 300 degrees F. When samples of downhole fluids are transported to the surface, change in temperature of the fluids tends to occur, with attendant changes in volume and pressure. The changes in the fluids as a result of transportation to the surface cause phase separation between gaseous and liquid phases in the samples, and changes in compositional characteristics of the formation fluids, among other variations in fluid properties.

As a consequence of shortcomings in surface analysis of formation fluids, recent developments in downhole fluid analysis include techniques for characterizing formation fluids downhole in a wellbore or borehole. In this, sampling tools for extracting samples of formation fluids from a borehole for surface analysis, such as the Reservoir Formation Tester (RFT) and Modular Formation Dynamics Tester (MDT) of Schlumberger, may include one or more fluid analysis modules, such as the Composition Fluid Analyzer (CFA) and Live Fluid Analyzer (LFA) of Schlumberger, for example, to analyze downhole fluids sampled by the tool while the fluids are still downhole.

In downhole fluid analysis modules of the type described above, formation fluids that are to be analyzed downhole flow past a sensor module associated with the fluid analysis module, such as a spectrometer module, which analyzes the flowing fluids by infrared absorption spectroscopy, for example. In this, an optical fluid analyzer (OFA), which may be located in the fluid analysis module, may identify fluids in the flow stream and quantify the oil and water content. U.S. Pat. No. 4,994,671 (incorporated herein by reference in its entirety) describes a borehole apparatus having a testing chamber, a light source, a spectral detector, a database, and a processor. Fluids drawn from the formation into the testing chamber are analyzed by directing the light at the fluids, detecting the spectrum of the transmitted and/or backscattered light, and processing the information (based on information in the database relating to different spectra), in order to characterize the formation fluids.

In addition, U.S. Pat. Nos. 5,167,149 and 5,201,220 (both incorporated herein by reference in their entirety) describe apparatus for estimating the quantity of gas present in a fluid stream. A prism is attached to a window in the fluid stream and light is directed through the prism to the window. Light reflected from the window/fluid flow interface at certain specific angles is detected and analyzed to indicate the presence of gas in the fluid flow.

As set forth in U.S. Pat. No. 5,266,800 (incorporated herein by reference in its entirety), monitoring optical absorption spectrum of fluid samples obtained over time may allow one to determine when formation fluids, rather than mud filtrates, are flowing into the fluid analysis module. Further, as described in U.S. Pat. No. 5,331,156 (incorporated herein by reference in its entirety) by making optical density (OD) measurements of the fluid stream at certain predetermined energies, oil and water fractions of a two-phase fluid stream may be quantified.

As discussed above, optical systems have been used by the oil industry in downhole conditions. A spectrometer of the type generally used in downhole tools is based on filter array (FA) architecture using optical bandpass filters. Spectrometer input light is distributed on an array of optical bandpass filters and the optical absorption of formation fluids is measured at a fixed number of discrete wavelengths which are limited to the number of filters. Filter spectrometers, however, are not suitable for precise measurements of the hydrocarbon spectra with high wavelength resolution. Since conventional spectrometers use optical bandpass filters to separate light into spectral components, the spectral resolution is not good. Therefore, precise spectrum analysis with high wavelength resolution is not possible with a conventional type of spectrometer.

Size and cost factors also play a role in the unsuitability of filter spectrometers for downhole analysis of hydrocarbon fluids. Conventional spectrometers tend to be large in size because a set of filters and lenses, and a photo detector are required for each measurement channel. Consequently, conventional optical bandpass spectrometers are expensive.

Furthermore, despite a conventional spectrometer's cost, the number of measurement channels is limited by the space available in a bandpass spectrometer designed for downhole use. Since a typical downhole tool has limited space, the size of a bandpass spectrometer that is required to measure a suitable range of wavelength spectra is a disadvantage for downhole use.

Optical spectrometers that use gratings are known for surface uses, such as in a laboratory setting, but to applicants' knowledge presently there is no suitable grating spectrometer for downhole use. In this, since typical downhole conditions, such as temperature, pressure, among others, are extremely harsh operating conditions for spectrometry, conventional surface-use grating spectrometers are not adapted for downhole fluid analysis in an oil field setting.

Although grating spectrometers have been proposed for downhole use, practical implementation of the proposed spectrometers has been difficult. Significant limitations exist in conventional grating performance in high temperature (HT) environments that are typically found downhole.

SUMMARY OF THE INVENTION

In consequence of the background discussed above, and other factors that are known in the field of downhole spectral analysis of fluids, applicants recognized a need for a downhole grating that is adapted for applications relating to measurements of spectra under downhole conditions.

The present invention provides methods and apparatus suitable for downhole applications relating to semi-continuous spectral coverage in hydrocarbon overtone mode areas that are particularly relevant for near infrared (NIR) fluid analysis of hydrocarbons, such as $CH_4$, $C_2H_6$, $C_3H_8$, among others, in downhole formation fluids. One apparatus of the invention, referred to as a spectrometer generally, includes an optical filter, a slit, a concave mirror, an inorganic replica-type optical grating, and photo detector array, wherein the grating comprises substantially one or more inorganic materials and is configured for providing diffraction of light in high temperature environments. As used herein, the term "high temperature downhole environments" refers to downhole temperatures in excess of ambient temperature, typically in the order of about 80 degrees Celsius and more, downhole pressures typically from about 100 to about 2,000 bar, densities in the range 300 to 1300 kg $m^{-3}$, and viscosities from about 0.1 to about 1000 mPa s.

Another apparatus of the invention may comprise a tunable laser-based device. Advantageously, in order to measure hydrocarbon spectra under downhole conditions, components of the apparatus, such as diffractive elements for spectral analysis of downhole fluids, are selected for high temperature applications.

In one aspect, the present invention provides evaluation of the continuous spectrum of light in downhole conditions, using as a diffractive element one or more inorganic replica-type gratings that are comprised substantially of inorganic material. In another aspect of the invention, tunable downhole spectral analysis is effectuated by a grating-based tool with an actuated diffractive element comprising a substantially inorganic replica-type grating of the present invention.

As one feature of the invention, a grating wavelength range is selected from about 1600 nm to about 1800 nm, where the hydrocarbon spectra are located, thereby providing advantageous applications for one embodiment of a downhole spectral analysis apparatus of the invention. Preferably, a photo detector array is selected having an extended wavelength, such as an Indium-Gallium-Arsenic (InGaAs) type photo detector array. Dark current and sensitivity changes at high temperature of a photo detector are removed by electronics, active cooling system, and software, for example.

In one embodiment of the invention, a fluid analysis module, such as Schlumberger's Ultra Fluid Analyzer (UFA) for the MDT formation tool, identifies a fluid sample in a flowline of the module and measures sample fluid properties with spectral analysis. In this, one advantageous aspect of the present invention is one or more suitable devices, such as a tunable spectrometer and/or a tunable laser device, for the UFA, which measure the hydrocarbon spectra from about 1600 nm to about 1800 nm wavelength range.

In accordance with the invention, a grating for downhole applications comprises a substantially inorganic substrate having grooves therein with a groove density of less than about 5000 grooves/mm. In one aspect of the invention, groove density is configured for wavelengths from about 200 nm to about 4000 nm. In other aspects of the invention, gratings are configured for downhole fluorescence measurements of fluids in a borehole with wavelengths from about 400 nm to about 1000 nm; for downhole fluid analysis by absorption spectroscopy in a borehole with wavelengths from about 1400 nm to about 2100 nm; and for downhole chemical sensing by dye injection of fluids in a borehole.

In yet other embodiments, a grating comprises a replica-type grating configured for high temperature applications in temperatures greater than or equal to 80 degrees Celsius. A grating may comprise a coating of metal and be configured for reflecting incident light. In other aspects, a grating may be configured for transmitting incident light. In certain embodiments of the present invention, a substrate of a grating comprises substantially one or more material selected from the group consisting of glass, quartz, sapphire, silicon carbide and ceramic. A groove density of the grating may be configured for spectral analysis in a spectral area comprising hydrocarbon overtone mode area.

One downhole fluid characterization apparatus according to the present invention comprises at least one optical spectrometer having a grating of substantially inorganic material with at least five spectral wavelength channels having respective wavelengths greater than or equal to from about 200 nm. A grating of a downhole apparatus may be configured for 16 wavelength channels, and the apparatus comprise a photo-detector array configured for detecting the 16 wavelength channels of the grating. Aspects of the present invention include optical spectrometers that are configured for absorption spectroscopy of borehole fluids; for measurements of fluorescence reemission of borehole fluids; and for Raman spectroscopy of borehole fluids.

In yet other embodiments of the present invention, one spectral analyzer for operation at high temperatures comprises a substantially inorganic grating for light spectral dispersion in downhole high temperatures; a light source, such as one or more of a halogen bulb, a light emitting diode, a tunable laser and a monochromator; and the high temperatures being greater than or equal to 80 degrees Celsius.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain principles of the present invention.

Figure 1A:
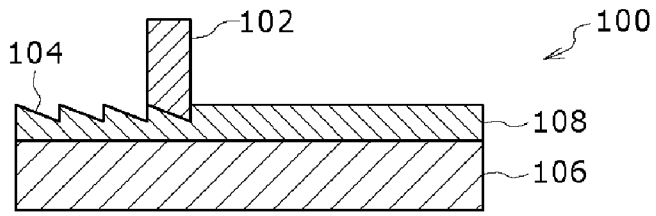
FIG. 1A schematically depicts a manufacturing process for ruled-type master grating.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION

Illustrative embodiments and aspects of the invention are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having benefit of the disclosure herein.

The present invention contemplates utilizing a grating, such as an inorganic replica grating, for light spectral dispersion in downhole environments. For example, such gratings may be used in a variety of instruments configured for downhole applications in a well traversing a formation, such as a spectrometer, tunable light sources, for example, laser, monochromator, among other instruments. It is contemplated that the present invention has applicability in wireline, production logging, logging-while-drilling (LWD), permanent monitoring, drilling and measurements applications, among other oilfield-related applications. In particular, the present invention contemplates spectral analysis under extreme downhole conditions, such as found in hydrocarbon reservoirs, and in applications relating to sequestration of $CO_2$ and management of water reservoirs.

Prior grating spectrometers for surface applications have relied upon two types of grating, viz., master-type gratings and replica-type gratings with patterning on a thin-film epoxy resin. A master-type grating is usually made on a hard substrate, such as glass or metal, and has good thermal stability. However, the manufacturing process for a master-type grating makes such gratings expensive. For example, master-type grating patterning using a holographic technique is complicated and expensive and, due to the complexity of the manufacturing process, reproducibility from one grating to another one can be difficult.

Conventional replica-type gratings, on the other hand, are patterned on a thin film of an organic material, such as an epoxy resin. Epoxy resins are organic compounds that tend to degrade at high downhole temperatures. Therefore, conventional replica-type gratings are unsuitable for high temperature environments such as those typically found downhole. Replica-type gratings, however, are cheaper than master-type gratings and reproducibility from batch to batch tends to be more reliable.

A diffraction grating, whether a master-type or a replica-type, is characterized by groove density and grating surface, and the parameters fix the grating's dispersion properties and its intrinsic optical resolution. Applicants noted that the groove density ($groove_{den}$) of a grating according to one embodiment of the present invention is less than or equal to $2/l_{max}$, where $l_{max}$ is the maximum possible wavelength at which the grating can operate. Applicants recognized that suitable replica-type gratings for downhole applications according to the present invention could be configured based upon the aforementioned mathematical relationship so that economical and accurate grating based downhole tools could be implemented. Moreover, the groove shape may be tuned to optimize efficiency of a grating in some particular diffraction orders. Different profiles are available, i.e., rectangular, blazed, sinusoidal, and the type of grating surface can be flat or concave, i.e., spherical, or other more complicated surface shapes. Finally, correction of aberration characterizes a grating in that conventional flat gratings have parallel grooves, but it is possible to manufacture grooves that are not parallel in order to correct the optical aberration, i.e., the grating is "aberration corrected."

Figure 1B:
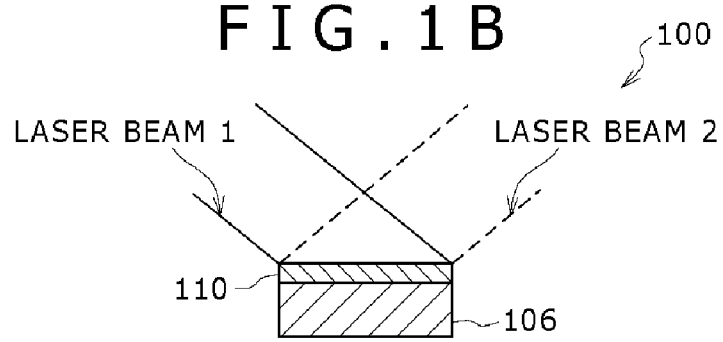
FIGS. 1B and 1C schematically depict one manufacturing process for holographic-type master grating.
Figure 1C:
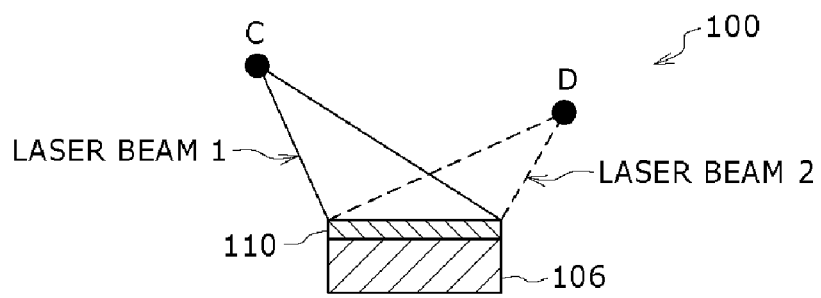

As previously discussed, gratings may be classified by their manufacturing process and material, i.e., organic or inorganic, into master-type gratings and replica-type gratings. In master-type gratings the grooves are shaped directly on the grating surface, as schematically depicted in FIGS. 1A to 1E. FIG. 1(A) depicts manufacture of a mechanically ruled master-type grating 100 wherein a diamond tool 102 forms a network of parallel grooves 104 across a substrate 106 coated with a metal 108, for example, aluminum. In this case, however, there are limitations with respect to groove density, groove shape, aberration correction and formation of parallel grooves FIGS. 1(B) and 1(C) represent holographic recording techniques for manufacture of a master-type grating 100, which are applicable to both plane and concave gratings. The manufacture includes holographic recording and groove shaping. As depicted in FIGS. 1(B) and 1(C), in a holographic recording, a substrate 106 is initially coated with a photosensitive resin 110, which is then exposed to interference fringes created by two laser beams. The holographic recording may be performed by two optical schemes, as depicted in FIGS. 1(B)

and 1(C). In one technique (FIG. 1(B)), two collimated laser beams interfere to pattern parallel and equidistant grooves, which are equivalent to a mechanically ruled master-type grating. In another technique (FIG. 1(C)), two point laser sources, which are not located symmetrically with respect to the substrate 106, are adjusted to record curved grooves with non-uniform density onto the photosensitive layer 110 thereby creating a groove network that is corrected for grating aberration. Two other techniques, viz., for stigmatic grating and for monochromator grating, are not discussed herein.

Figure 1D:
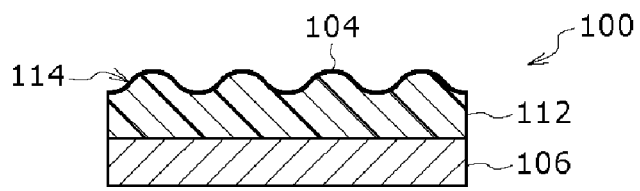
FIG. 1D schematically depicts a sinusoidal etching process for holographic-type master grating.

FIG. 1(D) depicts groove shaping for a holographic master-type grating 100 with sinusoidal grooves 104 that are directly etched on a photoresist layer. After the holographic process, a printed photosensitive resin 112 covers the substrate 106. Groove shaping can then be performed on the photosensitive resin 112 by chemical processing to etch away part of the resin 112 to form a sinusoidal corrugation 104 on the resin. The resin 112 is coated with a metal layer 114 to complete manufacture of the grating 100.

Figure 1E:
FIG. 1E schematically depicts ion etching of grooves formed on master grating substrate.

FIG. 1(E) depicts an ion etching technique for a master-type grating 100. Photosensitive resin is used as a protection mask for ion etching of substrate 106 with corrugations 104. Various shapes of grooves 104 may be formed directly on the grating substrate 106.

Figure 2A:
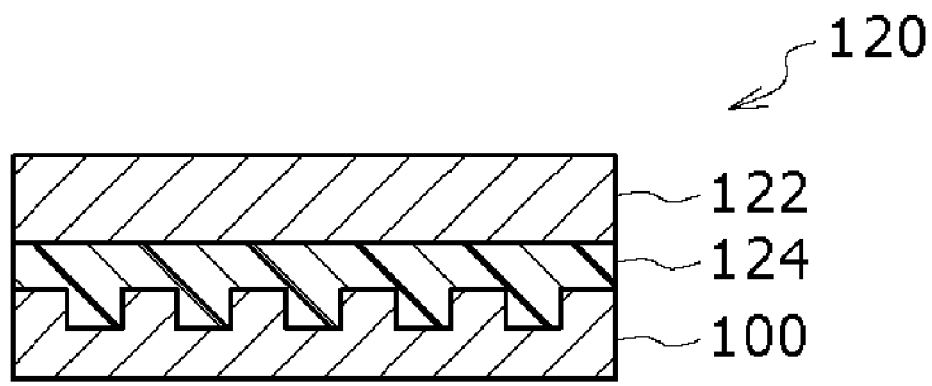
FIGS. 2A and 2B schematically depict a manufacturing process for replica grating.
Figure 2B:
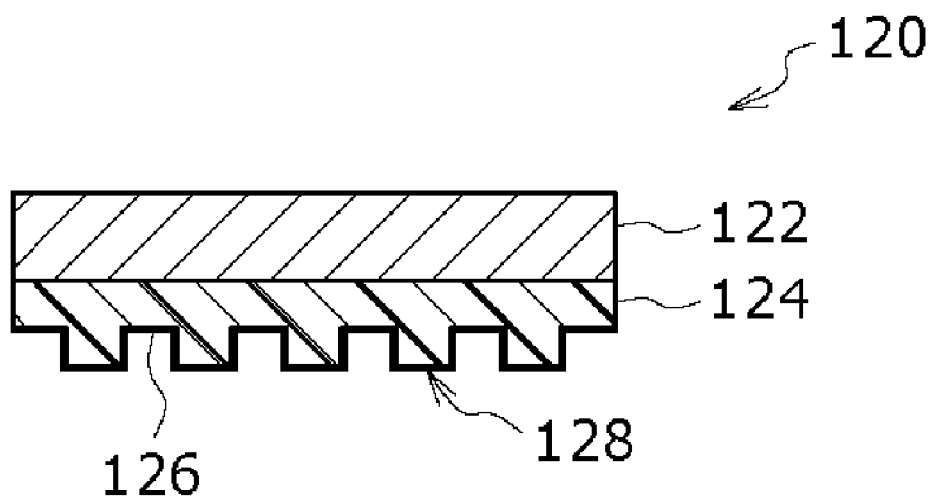

FIGS. 2(A) and 2(B) depict manufacture of a replica-type grating 120 from a master grating 100. In this, replica-type gratings are replications of master-type gratings using the "master" for molding the "replica", as depicted in FIGS. 2(A) and 2(B). FIG. 2(A) depicts manufacture of a replica-type grating 120 from a master 100. Replica substrate 122 is covered with an epoxy resin 124 and pressed against the master 100. The resin 124 is then cured for solidification and the substrate 122 with the resin 124 thereon is separated from the master 100 (note FIG. 2(B)). Grooves 126 of the master 100 are therefore replicated on the resin 124. Applying a metal coating 128 completes the replica-type grating 120 depicted in FIG. 2(B). Advantages of a replica-type grating include reduction in manufacturing cost in comparison with a master-type grating and fidelity between replicas from a same master.

Grating spectrometers are instruments or devices used for the spectral analysis of light. Grating spectrometers provide an estimation of light power density as a function of wavelength. As discussed above, conventional grating spectrometers are primarily intended for surface, i.e., room temperature (RT), applications. Grating spectrometers for downhole use are disclosed in, for example, U.S. Pat. No. 5,166,747, the contents of which are hereby incorporated herein by reference in their entirety.

As used herein, the term "spectroscopy" refers to the production and investigation of spectra and the term "spectroscopic devices" includes instruments for forming and examining spectra especially in the visible region of the electromagnetic spectrum including, but is not limited to, a spectrometer, among other instruments for spectral analysis of downhole fluids. The term "master-type grating" refers to an original ruled or holographic grating produced on a hard substrate and the term "replica-type grating" refers to a replication that is made from a master-type grating. The term "inorganic" refers to one or more of metal, glass, silicon carbide, ceramic, quartz, sapphire, among other hard inorganic materials suitable for the purposes disclosed herein, and the term "inorganic replica-type grating" refers to a grating formed on a substantially inorganic substrate by transferring an external master periodic structure onto the inorganic substrate such that the grooves are in substantially inorganic material suitable for HT applications. An inorganic grating as disclosed herein may include a coating of suitable material, such as metal, over the grooved substrate so as to provide a reflecting surface on the grating.

Applicants recognized that for downhole applications the implementation of a grating-based architecture would provide significant advantages in comparison with the currently available fixed array (FA) tool architecture. In this, applicants recognized that a grating-based device would extend the number of available spectral channels. For example, a grating spectrometer would provide higher spectral channel density based upon the grating architecture. For example, in association with a very high density spectral detector, such as a linear CCD, for example, a grating-based device could provide a significantly large number of spectral channels.

In another aspect of the invention, applicants recognized that a grating of the present invention may be tunable. In this, the grating may be actuated so that the spectral range of analysis would depend on the grating position. In this case, depending on the resolution in the grating actuation, the spectral analysis capabilities of the device may be expanded to an almost continuous number of channels.

Applicants further recognized that a grating-based tool of the present invention would provide enhanced measurement stability. For example, in a conventional fixed array (FA) architecture, light enters the spectrometer, is split and then is directed to different optical filters. As a consequence, spectral analysis is performed by units that are physically and spatially different. In contrast, in a grating device of the present invention wavelengths are separated by the same diffractive element, i.e., the grating, and follow the same optical path thereby increasing stability of the spectral measurements.

Applicants discovered surprising results in utilizing a new type of grating-based downhole spectral analysis tool having a diffraction element comprising an inorganic replica-type grating. In this, the systems of the present invention contemplate broad spectral coverage using a single filtering element. As previously discussed above, conventional replica-type gratings are formed using a similar process except that transfer of the pattern is done onto an epoxy substrate. Applicants recognized that inorganic materials, such as silica glass, quartz, sapphire, silicon carbide, ceramic, for example, tend to be much more temperature resistant than organic materials. Advantageously, such inorganic materials have very high thermal stability.

Figure 3:
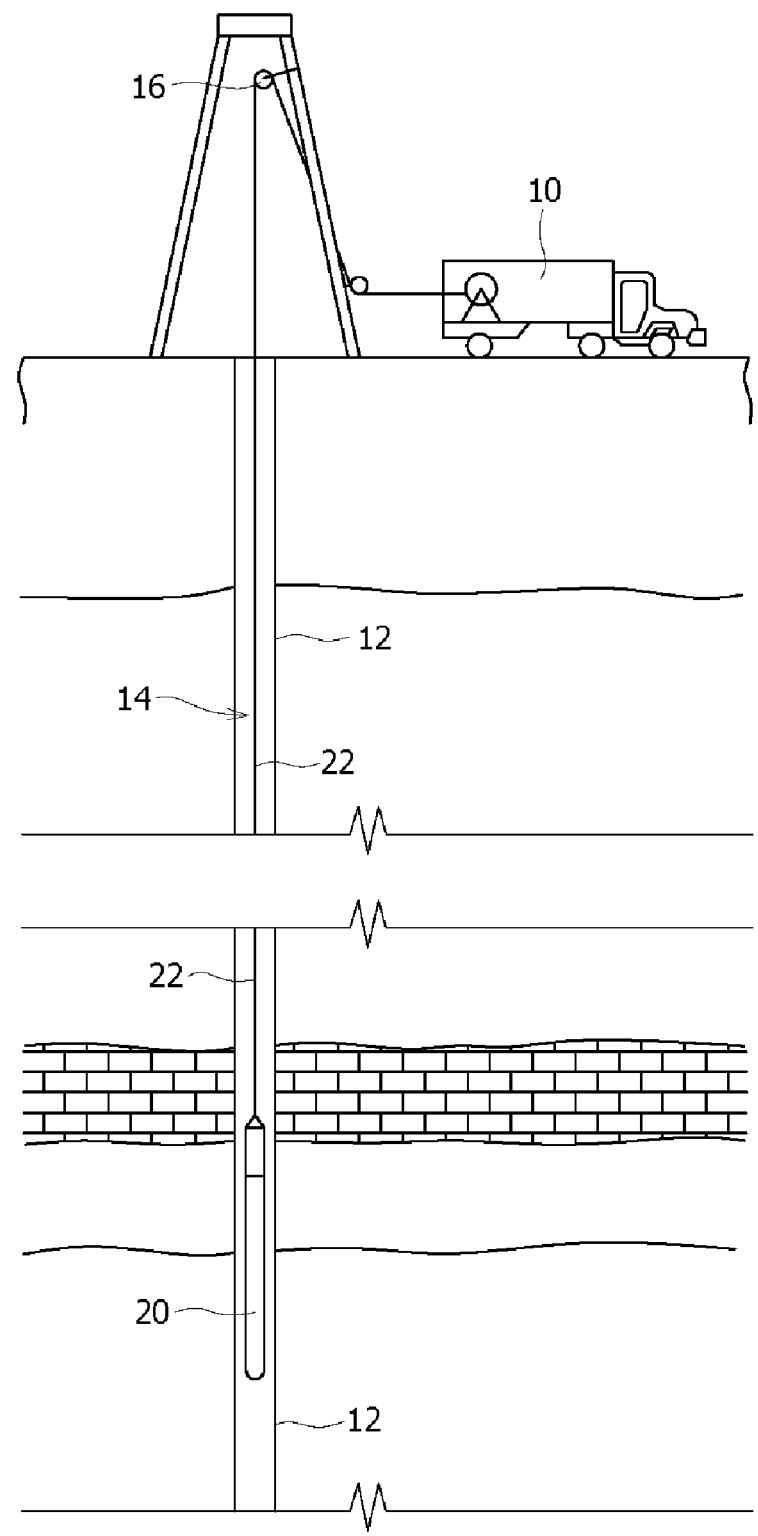
FIG. 3 is a schematic representation in cross-section of one exemplary operating environment of the present invention.

FIG. 3 is a schematic representation in cross-section of an exemplary operating environment of the present invention wherein a service vehicle 10 is situated at a wellsite having a borehole or wellbore 12 with a borehole tool 20 suspended therein at the end of a wireline 22. FIG. 3 depicts one possible setting for utilization of the present invention and other operating environments also are contemplated by the present invention. Typically, the borehole 12 contains a combination of fluids such as water, mud filtrate, formation fluids, etc. The borehole tool string 20 and wireline 22 typically are structured and arranged with respect to the service vehicle 10 as shown schematically in FIG. 3, in an exemplary arrangement.

A formation tester, such as the MDT, has two salient functions. Typically, a formation tester conducts pressure testing and sampling of formation fluids. For a pressure test, a formation tester is used to measure the formation pressure at many different depths to identify fluid layers in formation fluids, such as gas, oil, and water boundaries. In a sampling job, a formation tester captures or extracts gas or fluid samples from the formation and conveys the captured sample or samples to the surface.

A formation tester, such as the MDT, typically also includes one or more fluid analysis modules, such as a CFA or LFA, which are used to analyze formation fluids in a flowline of the formation tester. Such downhole fluid analysis includes identifying fluid samples in the flowline and measuring fluid properties of the fluids by optical spectroscopic analysis, for example.

Figure 4:
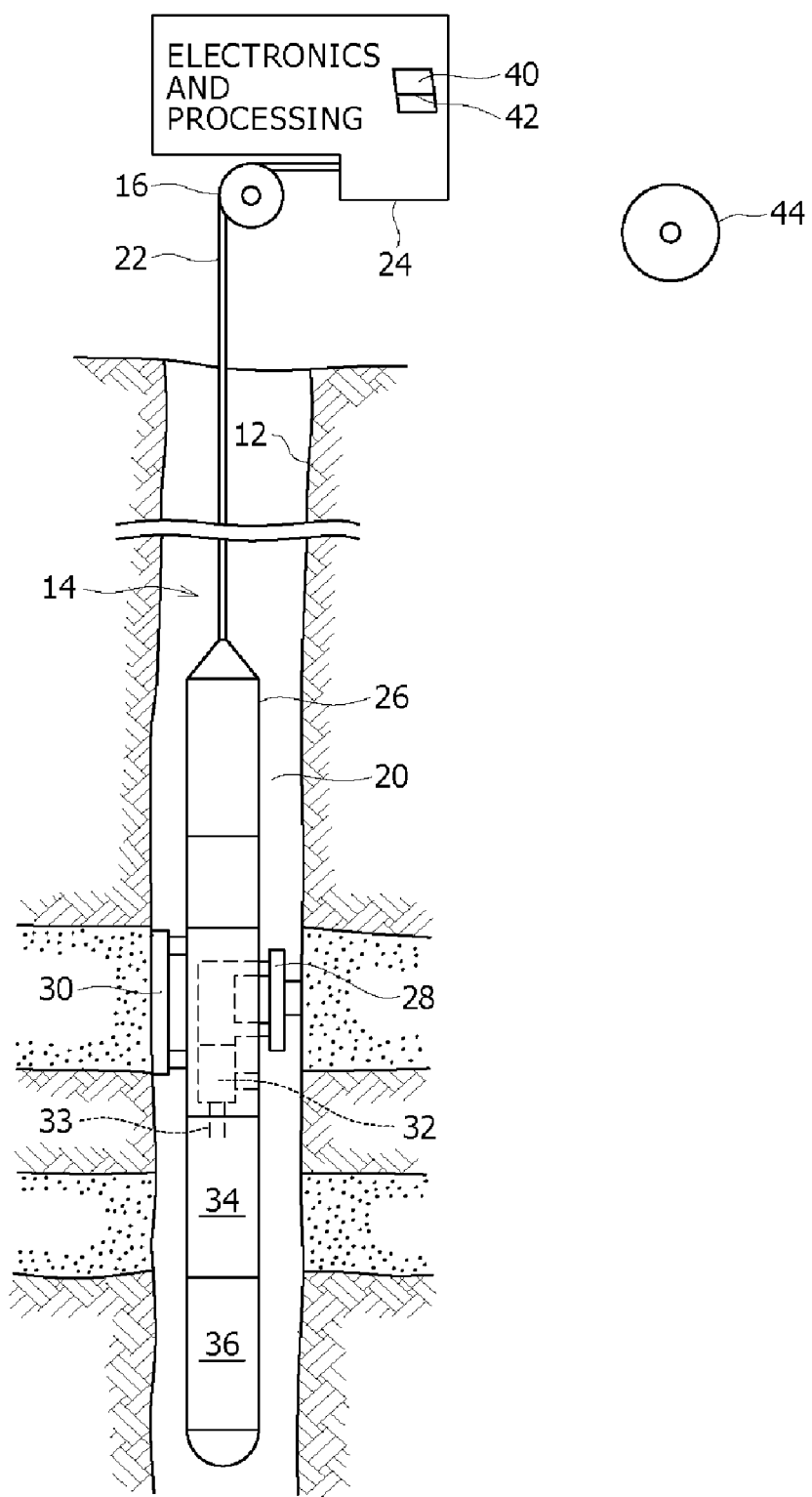
FIG. 4 is a schematic representation of one embodiment of a system for downhole analysis of formation fluids according to the present invention with an exemplary tool string deployed in a wellbore.

FIG. 4 is an exemplary embodiment of a system 14 for downhole analysis and sampling of formation fluids according to the present invention, for example, while the service vehicle 10 is situated at a wellsite (note FIG. 3). In FIG. 4, a borehole system 14 includes a borehole tool string 20, which may be used for testing earth formations and analyzing the composition of fluids from a formation. The borehole tool 20 typically is suspended in the borehole 12 (note also FIG. 3) from the lower end of a multiconductor logging cable or wireline 22 spooled on a winch 16 (note again FIG. 3) at the formation surface. The logging cable 22 typically is electrically coupled to a surface electrical control system 24 having appropriate electronics and processing systems for the borehole tool 20.

Figure 5:
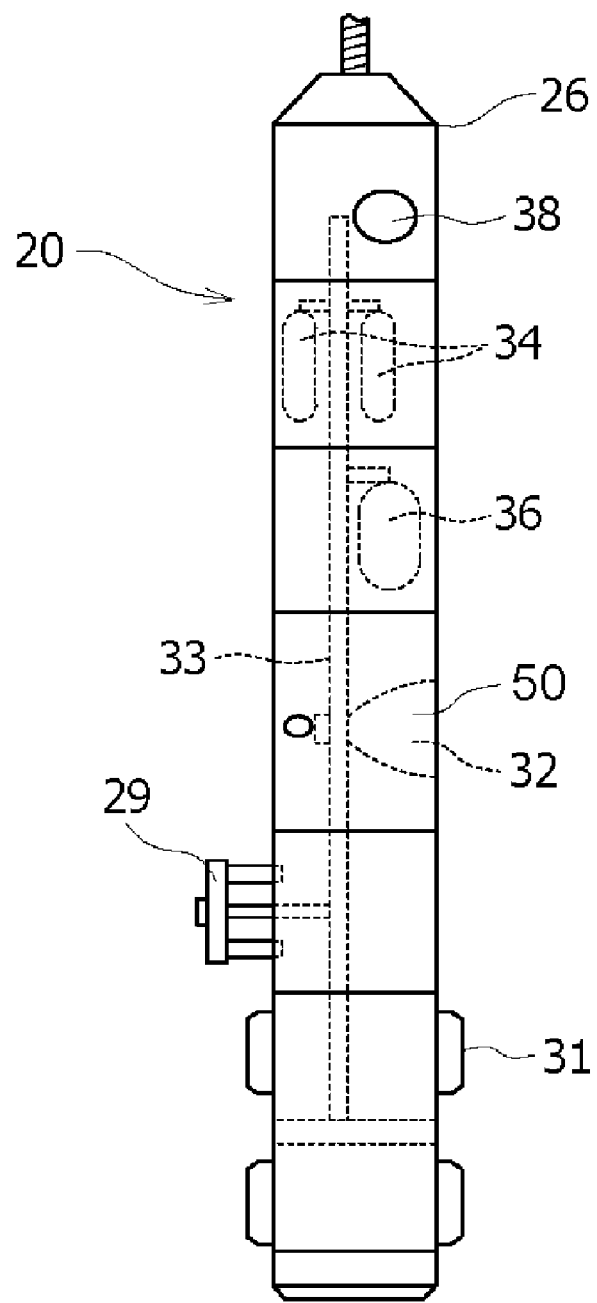
FIG. 5 shows schematically one embodiment of a tool string with a fluid analysis module having an inorganic replica-type grating-based device for downhole spectral analysis of fluids according to the present invention.

Referring also to FIG. 5, the borehole tool 20 includes an elongated body 26 encasing a variety of electronic components and modules, which are schematically represented in FIGS. 4 and 5, for providing necessary and desirable functionality to the borehole tool string 20. A selectively extendible fluid admitting assembly 28 and a selectively extendible tool-anchoring member 30 (note FIG. 4) are respectively arranged on opposite sides of the elongated body 26. Fluid admitting assembly 28 is operable for selectively sealing off or isolating selected portions of a borehole wall 12 such that pressure or fluid communication with adjacent earth formation is established. The fluid admitting assembly 28 may be a single probe module 29 (depicted in FIG. 5) and/or a packer module 31 (also schematically represented in FIG. 5). Examples of borehole tools are disclosed in the aforementioned U.S. Pat. Nos. 3,780,575 and 3,859,851, and in U.S. Pat. No. 4,860,581, the contents of which are incorporated herein by reference in their entirety.

One or more fluid analysis modules 32 are provided in the tool body 26 with one or more spectral analysis tools 50 configured therein to provide spectral analysis of downhole fluids according to the present invention. Fluids obtained from a formation and/or borehole flow through a flowline 33, via the fluid analysis module or modules 32, and then may be discharged through a port of a pumpout module 38 (note FIG. 5). Alternatively, formation fluids in the flowline 33 may be directed to one or more fluid collecting chambers 34 and 36, such as 1, 2 ¾, or 6 gallon sample chambers and/or six 450 cc multi-sample modules, for receiving and retaining the fluids obtained from the formation for transportation to the surface.

The fluid admitting assemblies, one or more fluid analysis modules, the flow path and the collecting chambers, and other operational elements of the borehole tool string 20, are controlled by electrical control systems, such as the surface electrical control system 24 (note FIG. 4). Preferably, the electrical control system 24, and other control systems situated in the tool body 26, for example, include processor capability for spectral analysis of formation fluids in the tool 20.

The system 14 of the present invention, in its various embodiments, preferably includes a control processor 40 operatively connected with the borehole tool string 20. The control processor 40 is depicted in FIG. 4 as an element of the electrical control system 24. Preferably, the methods of the present invention are embodied in a computer program that runs in the processor 40 located, for example, in the control system 24. In operation, the program is coupled to receive data, for example, from the fluid analysis module 32, via the wireline cable 22, and to transmit control signals to operative elements of the borehole tool string 20.

The computer program may be stored on a computer usable storage medium 42 associated with the processor 40, or may be stored on an external computer usable storage medium 44 and electronically coupled to processor 40 for use as needed. The storage medium 44 may be any one or more of presently known storage media, such as a magnetic disk fitting into a disk drive, or an optically readable CD-ROM, or a readable device of any other kind, including a remote storage device coupled over a switched telecommunication link, or future storage media suitable for the purposes and objectives described herein.

In some embodiments of the present invention, the methods and apparatus disclosed herein may be embodied in one or more fluid analysis modules of Schlumberger's formation tester tool, the Modular Formation Dynamics Tester (MDT). The present invention advantageously provides a formation tester tool, such as the MDT, with enhanced functionality for downhole spectral analysis of formation fluids. In this, the formation tester tool may advantageously be used for sampling formation fluids in conjunction with downhole spectral analysis of the formation fluids.

As discussed above, optical systems have been used by the oil industry in downhole conditions. Conventional downhole spectrometers use the filter array (FA) architecture, which allows evaluation of the optical absorption of a sampled fluid at a fixed number of discrete wavelengths. The central wavelength of each channel is fixed by the optical filters' transmission properties. In this, in situ tuning of the tool's wavelength coverage is not possible since the tool can be tuned only by changing the filters thereby preventing tuning while the tool is being operated downhole. In order to suitably analyze the composition of formation fluids, a precise analysis of hydrocarbon spectra from 1600 nm to 1800 nm is required. Absorption spectra of downhole fluids are distributed in a wavelength range from about 200 nm to about 4000 nm. Accordingly, in order to identify and to calculate the fraction of oil and water in a formation fluid sample, many measurement channels are required, for example, more than 5 measurement channels are preferred to accurately determine composition of a downhole fluid sample.

FIG. 5 shows one example of a tool string 20 with spectral analysis system 50 according to the present invention. A sampling job is initiated by the probe 29 and/or packer 31 extending out from the tool string 20 to contact with the formation. The pumpout module 38 draws formation fluid into the flowline 33 of the tool 20 and drains it to mud. In one embodiment of the invention, a module 32, for example, identifies a fluid sample in the flowline 33 to determine the nature of the fluid that is flowing in the flowline. The module 32 may calculate the volume fraction of water and oil based on optical spectroscopic analysis, for example. The module 32 may also analyze a sample contamination level and phase separation when a fluid sample is flowing inside the flowline 33. Advantageously, the fluid analysis module 32 may also measure sample fluid properties downhole, such as gas-oil-ratio (GOR), fluid composition, among other properties.

Figure 6:
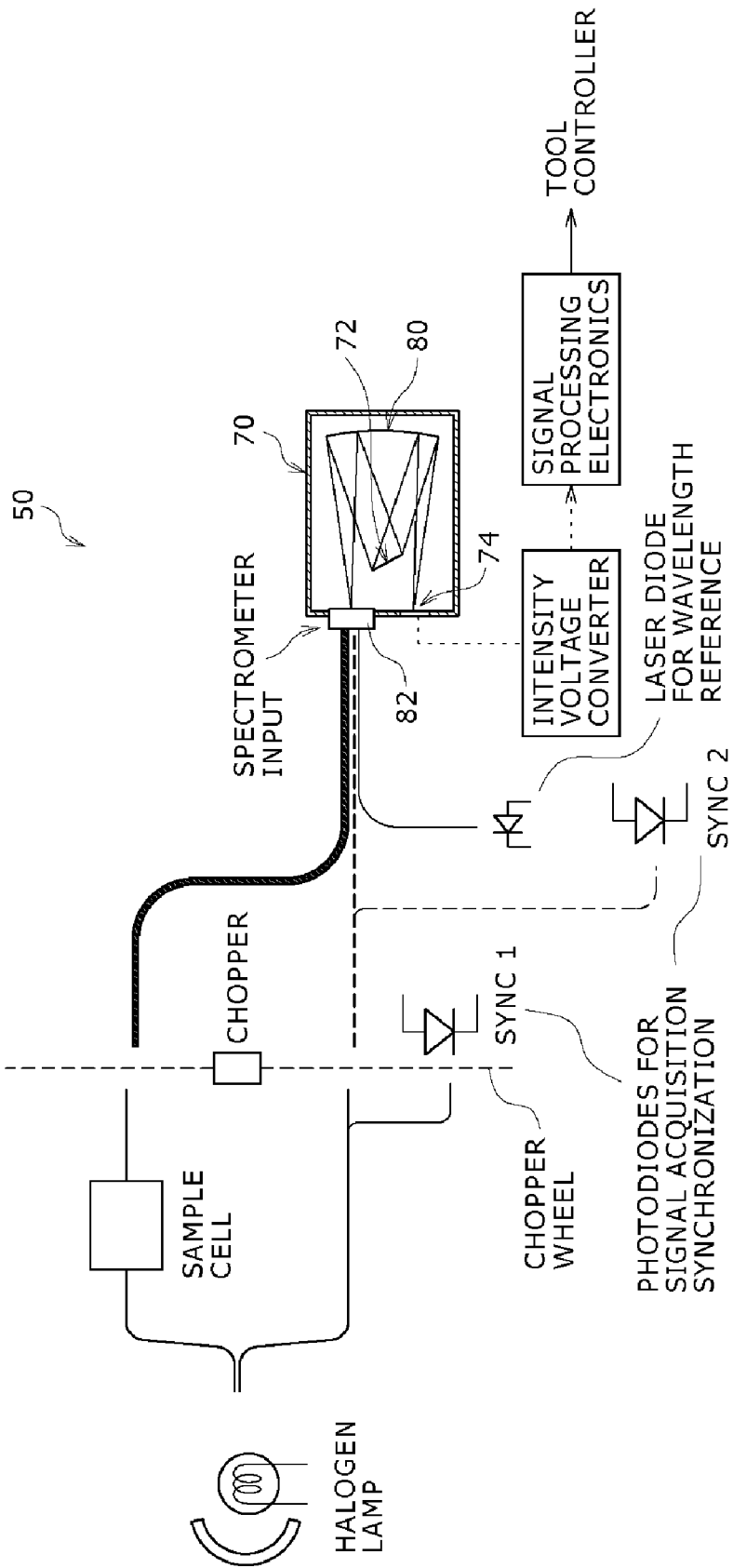
FIG. 6 is a schematic depiction of one embodiment of a spectral analysis tool with a grating spectrometer according to the present invention.
Figure 7:
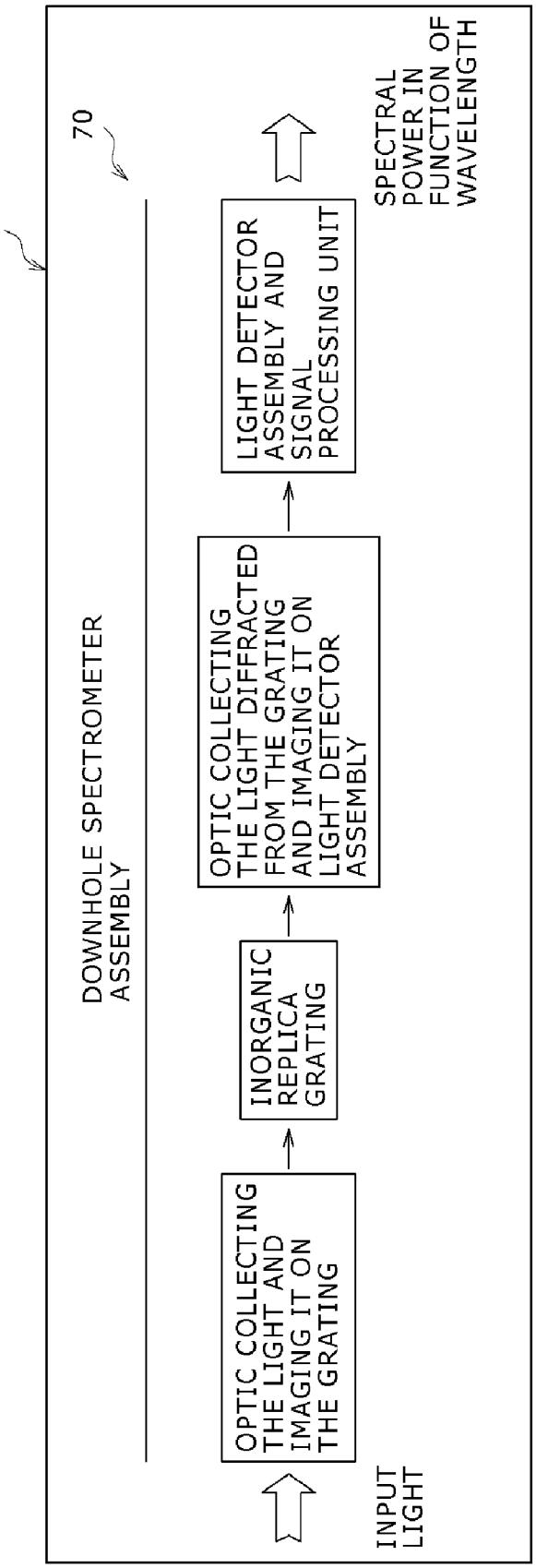
FIG. 7 is a schematic depiction of one embodiment of an inorganic replica-type grating spectrometer according to the present invention.

FIG. 6 is a schematic depiction of one embodiment of a spectral analysis system 50 with a grating according to the present invention. FIG. 7 schematically depicts one embodiment of an inorganic replica-type grating tool 70 according to the present invention for use in the spectral analysis system 50.

Referring to FIG. 7, light input into spectrometer assembly 70 may be generated downhole or may come from the surface, i.e., by way of a fiber optics bundle. Spectral separation of the input light is necessary to acquire spectral information. Possible applications include spectral analysis of light traveling through downhole formations and/or formation fluids acquired downhole. In particular, applications such as analysis of downhole fluid properties by infrared (IR) spectroscopy, spectral imaging, among other possibilities. The exemplary schematic depiction of FIG. 7 may be practically implemented in, for example, spectrometer architecture that uses a reflection-type inorganic replica grating, a transmission-type inorganic replica grating, among other possible implementations contemplated by the present invention.

Figure 8:
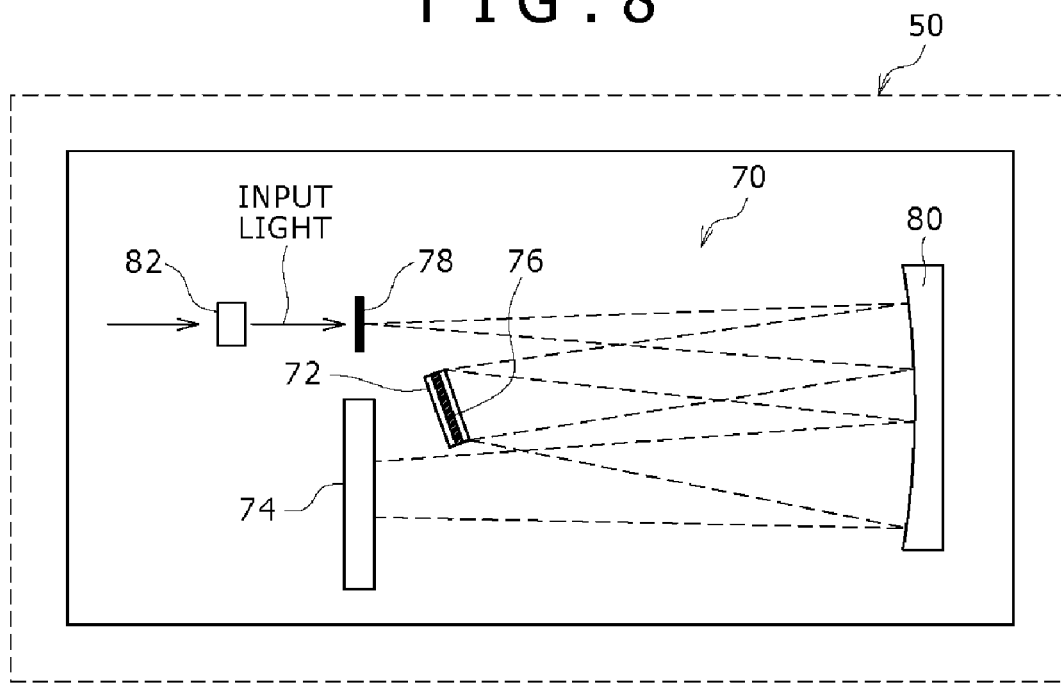
FIG. 8 is a schematic depiction of one embodiment of a tunable reflection grating spectrometer according to the present invention.

Referring to FIG. 8, one exemplary embodiment of a tunable grating spectrometer 70 according to the present invention includes a grating 72 and a photodetector array 74 having a plurality of photodiodes such that each photodiode corresponds to one fixed central wavelength depending on grating orientation. With non-tunable grating spectrometers, grating orientation is fixed so that the central wavelength of each pixel/photodiode is fixed and cannot be tuned. In contrast, in a tunable grating spectrometer by changing grating orientation it is possible to tune the central wavelength of each pixel/photodiode.

Grating orientation may be changed by actuation with, for example, a stepping motor 76 (note FIG. 8). A suitable stepping motor may be used to provide high angular resolution so that grating angle and measured wavelength may be precisely adjusted.

Referring to FIG. 8, the tunable grating spectrometer 70 comprises tunable grating 72, such as an inorganic replica-type grating of the present invention, with actuating motor 76 configured therewith to actuate the tunable grating 72, photodetector array 74, slit 78 and mirror 80. Light enters into the spectrometer 70, for example, through the slit 78 via a suitable optical filter 82, such as a longpass optical filter. As depicted in FIG. 8, input light is reflected and collimated by the concave mirror 80 and is incident onto the grating 72. The grating 72 diffracts the light and passes the diffracted light back to the mirror 80. The diffracted light is reflected and focused onto the photodetector array 74 by the mirror 80. In this, the spectrum of the input light (a continuous spectrum from shorter to longer wavelengths) is generated onto the photodetector array 74. The spectral components of the input light are separated by the pixels/cells of the photodetector array 74. Wavelength resolution is determined by grating wavelength specification and the number of pixels/cells of the photodetector array 74.

Figure 9:
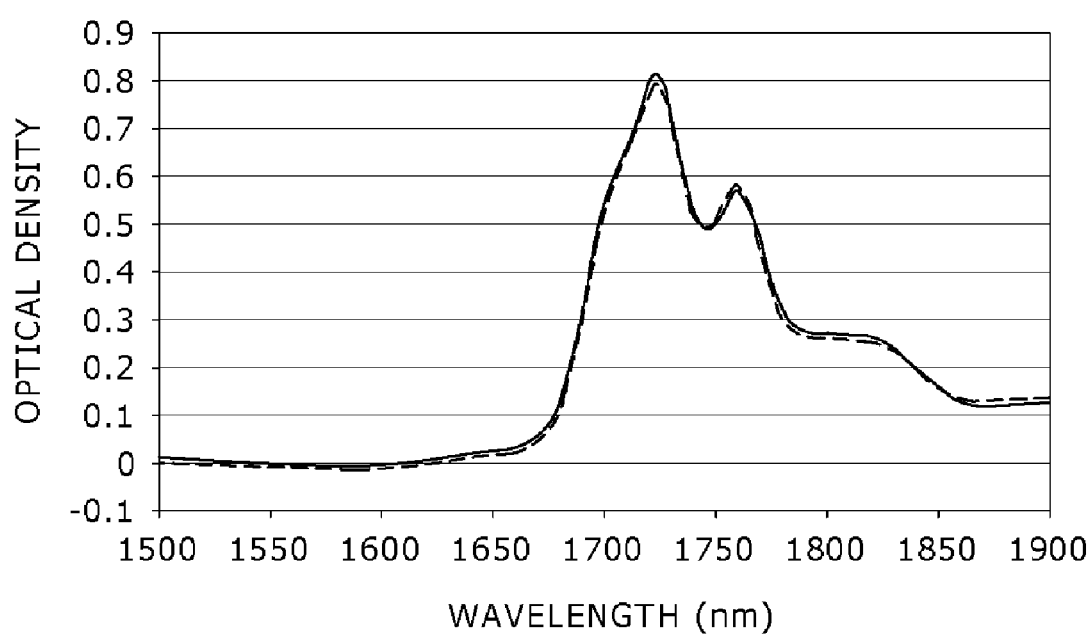
FIG. 9 shows graphically a comparison between measurements of heptane spectra by a laboratory prototype of a tunable inorganic replica-type grating spectrometer according to the present invention and a commercially available spectrometer with the hydrocarbon overtone mode area shown therein.

FIG. 9 shows a graphic comparison of heptane spectra measurements in a laboratory using a tunable grating spectrometer according to the present invention and a commercially available spectrometer. The broken line in FIG. 9 represents spectral data from the laboratory prototype of a tunable grating spectrometer and the continuous line represents data from the commercially available spectrometer. In this, the present invention in certain embodiments contemplates spectral coverage in the hydrocarbon overtone mode area that is necessary for near infrared (NIR) fluid analysis. The hydrocarbon overtone mode area is depicted in FIG. 9 in the range from about 1600 nm to about 1800 nm.

Figure 10:
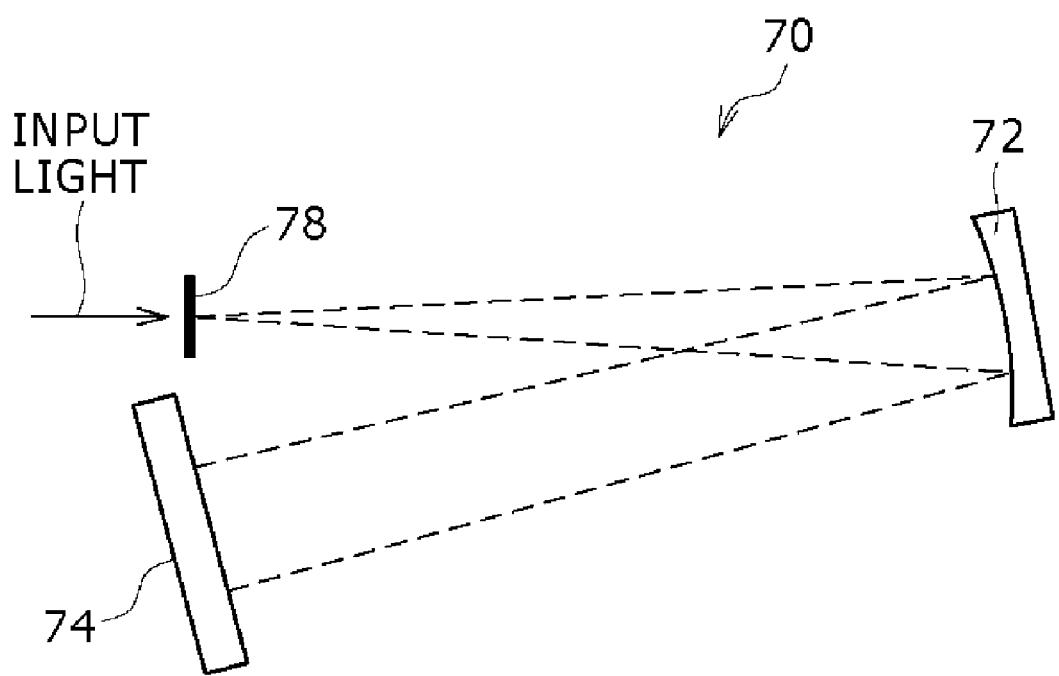
FIG. 10 is a schematic depiction of another embodiment of a reflection grating spectrometer according to the present invention.
Figure 11:
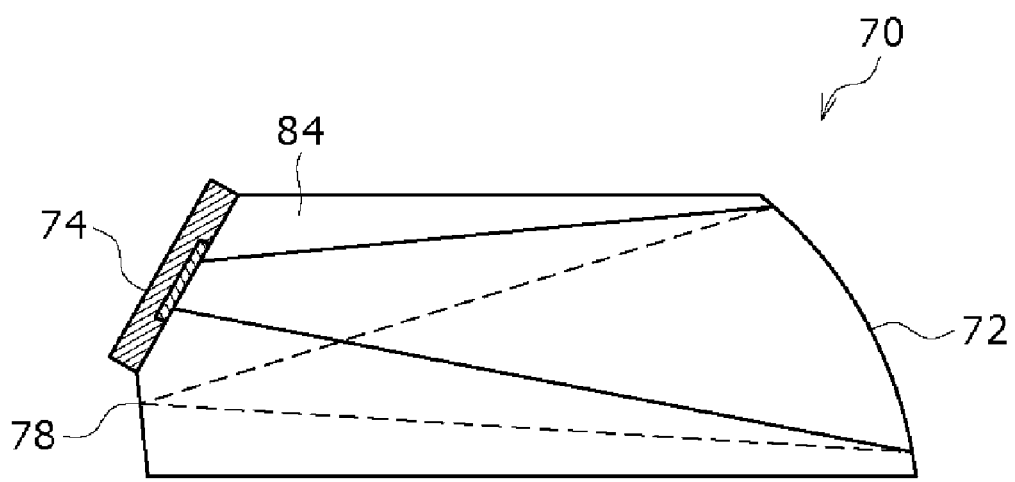
FIG. 11 is a schematic depiction of yet another embodiment of a reflection grating spectrometer according to the present invention.

FIGS. 10 and 11 are further exemplary embodiments of reflecting-type grating spectrometers according to the present invention. FIG. 10 depicts one example of a spectrometer 70 with a concave grating 72. The embodiment of FIG. 10 includes slit 78, concave grating 72, such as an inorganic replica-type grating of the present invention, and photodetector array 74. For example, the grating 72 in FIG. 10 may be an aberration-corrected fixed inorganic replica-type grating according to the present invention. The embodiment of FIG. 10 is advantageous in reducing size of the spectrometer and only precise orientation of the grating is required to provide the desired wavelengths for spectral analysis.

FIG. 11 schematically depicts an exemplary one-piece grating spectrometer 70 in which grating 72, such as an inorganic replica-type grating of the present invention, may be located on a convex surface of an optical block 84. Photodetector array 74 may be located on another surface of the optical block 84 and light entrance slit 78 may be located on a third surface of the optical block 84, as schematically depicted in FIG. 11. The grating spectrometer of FIG. 11 requires no adjustment, but accurate machining is necessary to manufacture the optical block 84.

Figure 12:
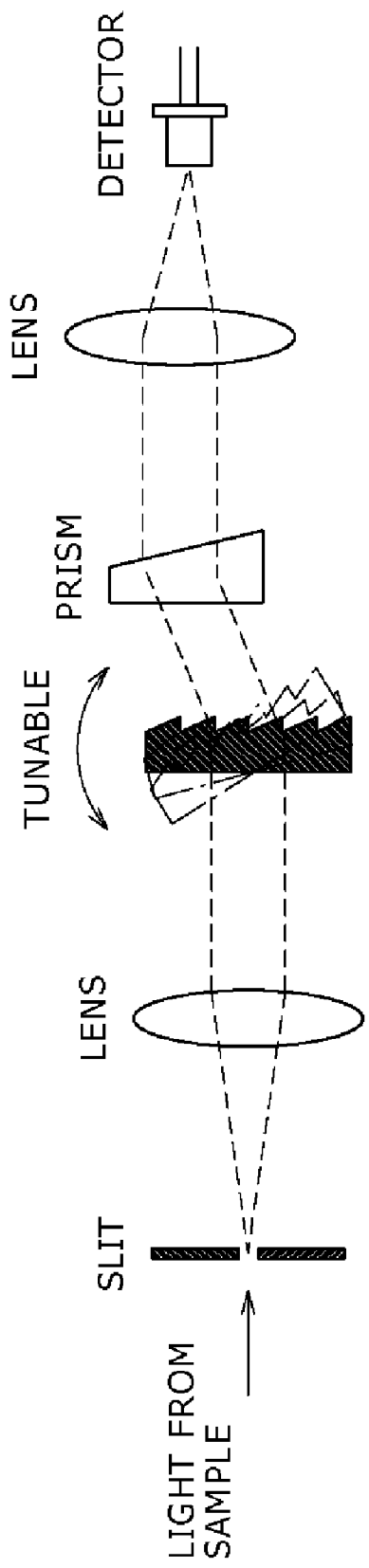
FIG. 12 is a schematic representation of an inline configuration for a grating spectrometer using a transmission grating according to one embodiment of the present invention.
Figure 13:
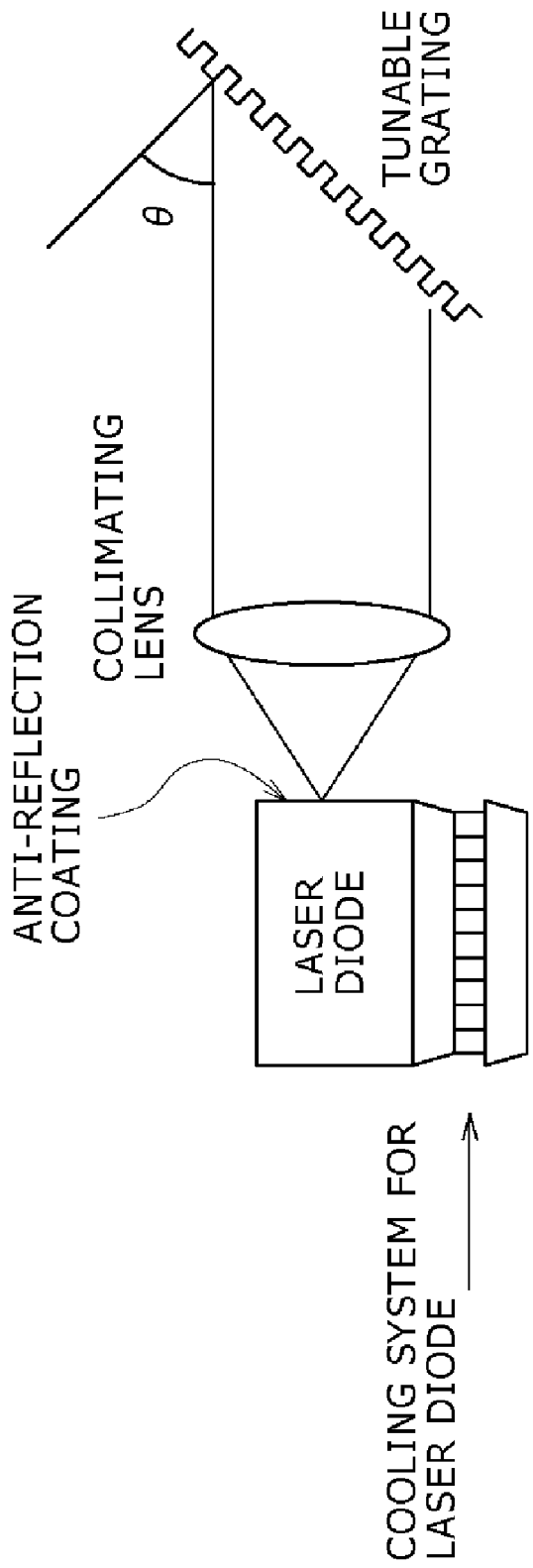
FIG. 13 is a schematic depiction of an external cavity tunable laser according to the present invention.
Figure 14:
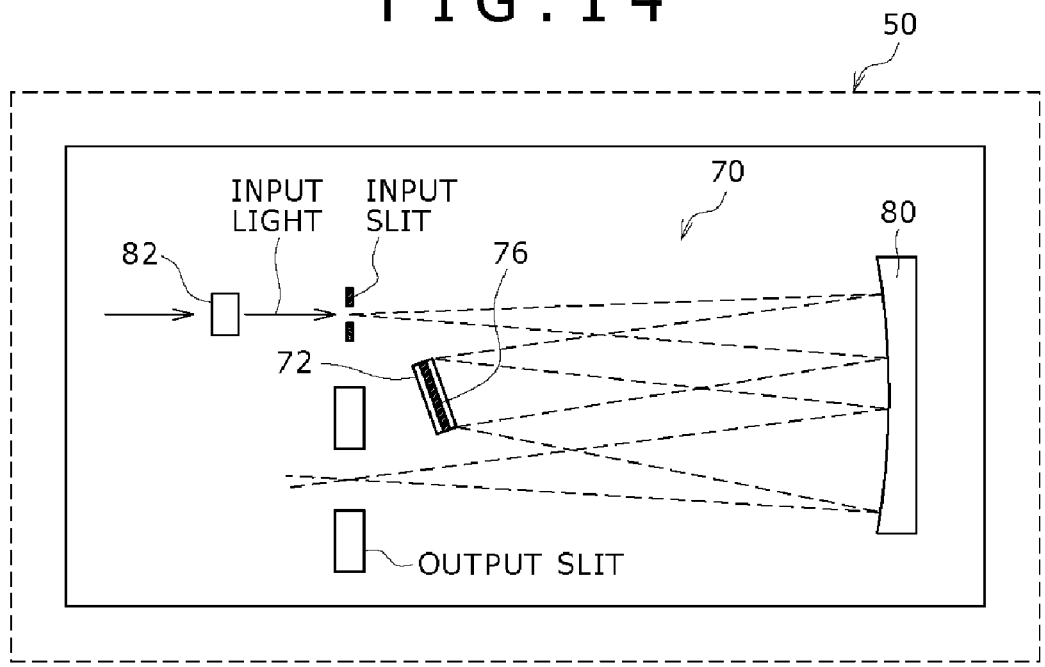
FIG. 14 is a schematic depiction of a monochromator using a reflection grating according to the present invention.

FIG. 12 depicts schematically one possible configuration of a transmission-type tunable grating according to the present invention for downhole spectral analysis. FIG. 13 is a schematic depiction of one possible configuration of a laser-based spectral analysis device with a tunable inorganic replica-type grating according to the present invention for downhole spectral analysis in high temperatures. FIG. 14 shows in a schematic depiction a monochromator using a reflection-type tunable grating according to the present invention Two methods of manufacturing inorganic replica-type gratings of the present invention are discussed hereinafter, although other methods are within the scope of the present invention. In transfer molding using a sol-gel process, the epoxy resin layer in a conventional replica-type grating is replaced by an inorganic gel deposited on a substrate (note FIG. 2(A)). The master grating is then pressed onto the gel to form the grating periodic structure. Substrate and gel are then heated and the gel forms a hard, solid surface with the master pattern embossed in it. Different gel compositions and processing steps have been described in, for example, U.S. Pat. Nos.: 6,849,209, 6,849,350 and 6,740,366, the entire contents of which are hereby incorporated herein by reference. Since curing of the gel is done at more than 300 degrees Celsius, it leads to a highly temperature-stable structure.

In near-field holography process, transfer of the master periodic structure is done by optical means. In this, the master grating includes a phase mask grating. The process is described in U.S. Pat. No. 6,693,701, the entire contents of which are hereby incorporated herein by reference. The process uses near-field holography to transfer a master grating periodic structure onto a substrate covered by a photosensitive resin. The resin is then developed and the substrate can be etched by any suitable method to form the grating grooves. The final grating is a single monolithic piece. In one embodiment, the substrate may be low thermal expansion glass, which leads to high thermal stability.

The aforementioned methods provide low manufacturing costs similar to conventional replica-type gratings with thermal stability equivalent to conventional master-type gratings. Accordingly, such inorganic replica-type gratings may advantageously be used in downhole grating tools of the type described herein. In particular, a combination of an inorganic replica-type grating with a tunable grating architecture for downhole spectral analysis of formation fluids provides unexpected results that were previously unattainable with conventional grating spectrometer architecture.

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims.

What is claimed is:

1. A downhole tool having a spectral analysis module comprising:
    a replica grating comprising a substantially inorganic substrate having grooves therein with a grating groove density for measuring wavelengths from about 200 nm to about 4000 nm.

2. A downhole tool having a spectral analysis module comprising:
    a replica grating comprising a substantially inorganic substrate having grooves therein with a grating groove density from about 50 grooves/mm to about 5000 grooves/mm and configured for wavelengths from about 200 nm to about 4000 nm.

3. The downhole tool according to claim 2, wherein the groove density is from about 100 grooves/mm to about 600 grooves/mm.

4. The downhole tool according to claim 1, wherein the grating takes downhole fluorescence measurements of fluids in a borehole with wavelengths from about 400 nm to about 1000 nm.

5. The downhole tool according to claim 1, wherein the grating makes downhole fluid analysis by absorption spectroscopy in a borehole with wavelengths from about 1400 nm to about 2100 nm.

6. The downhole tool according to claim 1, wherein the grating makes downhole chemical sensing by dye injection of fluids in a borehole.

7. The downhole tool according to claim 1 further comprising:
    a light source comprising one or more of a halogen bulb, a light emitting diode, a tunable laser and a monochromator, wherein the light source is provided before the replica grating.

8. The downhole tool according to claim 1, wherein the grating is for high temperature applications in temperatures greater than or equal to 80 degrees Celsius.

9. The downhole tool according to claim 8, wherein the grating further comprises a coating of metal and the grating is configured for reflecting incident light.

10. The downhole tool according to claim 8, wherein the grating is configured for transmitting incident light.

11. The downhole tool according to claim 1, wherein the grating substrate comprises substantially a material selected from the group consisting of glass, quartz, sapphire, silicon carbide and ceramic.

12. The downhole tool according to claim 1, wherein the grating groove density makes spectral analysis in a spectral area comprising hydrocarbon overtone mode area.

13. A downhole fluid characterization apparatus comprising:
    at least one optical spectrometer having a grating of substantially inorganic material, the grating being for at least five spectral wavelength channels having respective wavelengths greater than or equal to from about 200 nm.

14. The downhole fluid characterization apparatus according to claim 13, wherein
    the grating comprises a replica-type grating having substantially one or more material selected from the group consisting of glass, quartz, sapphire, silicon carbide and ceramic.

15. The downhole fluid characterization apparatus according to claim 14, wherein
    the grating has a coating of metal and is configured for reflecting incident light.

16. The downhole fluid characterization apparatus according to claim 15, wherein
    the grating has a generally flat reflecting surface.

17. The downhole fluid characterization apparatus according to claim 15, wherein
    the grating has a generally concave reflecting surface.

18. The downhole fluid characterization apparatus according to claim 14, wherein
    the grating is configured for transmitting incident light.

19. The downhole fluid characterization apparatus according to claim 14, wherein
    the grating is a tunable grating.

20. The downhole fluid characterization apparatus according to claim 13, wherein
    the grating performs operation in a wavelength range including wavelengths in hydrocarbon overtone mode area.

21. The downhole fluid characterization apparatus according to claim 20, wherein
    the wavelength range includes wavelengths from about 1600 nm to about 1800 nm.

22. The downhole fluid characterization apparatus according to claim 13, wherein
    the grating is for 16 wavelength channels,
    the apparatus further comprising:
    a photo-detector array for detecting the 16 wavelength channels of the grating.

23. The downhole fluid characterization apparatus according to claim 13, wherein
    the grating comprises grooves therein with a groove density of less than about 5000 grooves/mm.

24. The downhole fluid characterization apparatus according to claim 13, wherein
    the grating comprises a replica-type grating for high temperature applications in temperatures greater than or equal to 80 degrees Celsius.

25. The downhole fluid characterization apparatus according to claim 13, wherein
    the at least one optical spectrometer performs absorption spectroscopy of borehole fluids.

26. The downhole fluid characterization apparatus according to claim 13, wherein
    the at least one optical spectrometer takes measurements of fluorescence reemission of borehole fluids.

27. The downhole fluid characterization apparatus according to claim 13, wherein
    the at least one optical spectrometer performs Raman spectroscopy of borehole fluids.

28. A spectral analyzer for operation at high temperatures comprising:
    a substantially inorganic grating for light spectral dispersion in downhole high temperatures;
    a light source provided before the inorganic grating;
    the spectral analyzer performing operation in high temperatures greater than or equal to 80 degrees Celsius and a wavelength range from about 200 nm to about 4000 nm; and
    the grating having a groove density that is less than or equal to $2/\text{wavelength}_{max}$, wherein $\text{wavelength}_{max}$ represents the maximum operational wavelength of the grating.

29. The spectral analyzer for operation at high temperatures according to claim 28, wherein
    the light source comprises a monochromator.

30. The spectral analyzer for operation at high temperatures according to claim 28, wherein
    the light source comprises a tunable laser.

* * * * *